J. K. ROSS.
PNEUMATIC TIRE.
APPLICATION FILED OCT. 8, 1917.
1,321,556.
Patented Nov. 11, 1919.
2 SHEETS—SHEET 1.
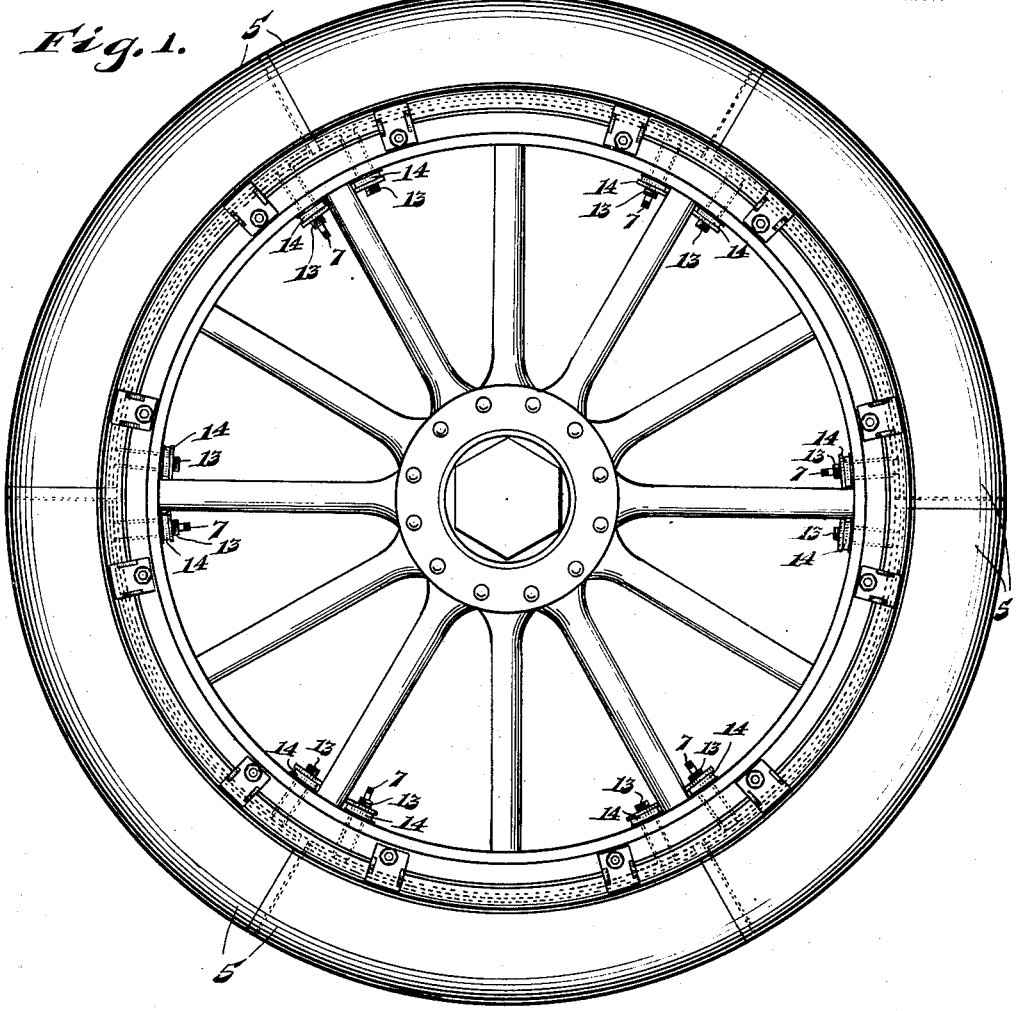
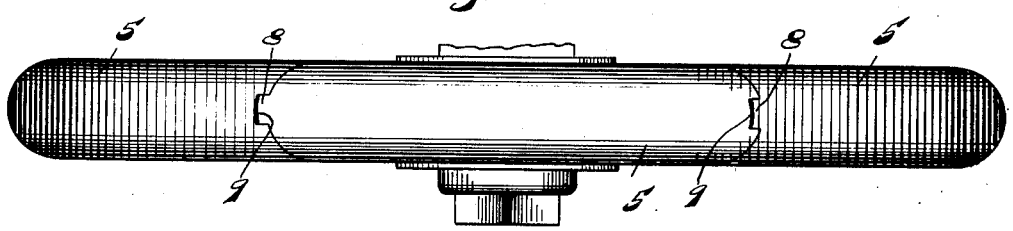
WITNESSES:
C. E. Wessels
A. A. Olson
INVENTOR.
John K. Ross
BY
his ATTORNEY J. K. ROSS.
PNEUMATIC TIRE.
APPLICATION FILED OCT. 8, 1917.
1,321,556.
Patented Nov. 11, 1919.
2 SHEETS—SHEET 2.
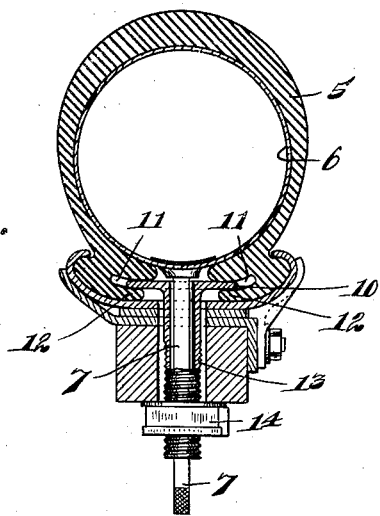
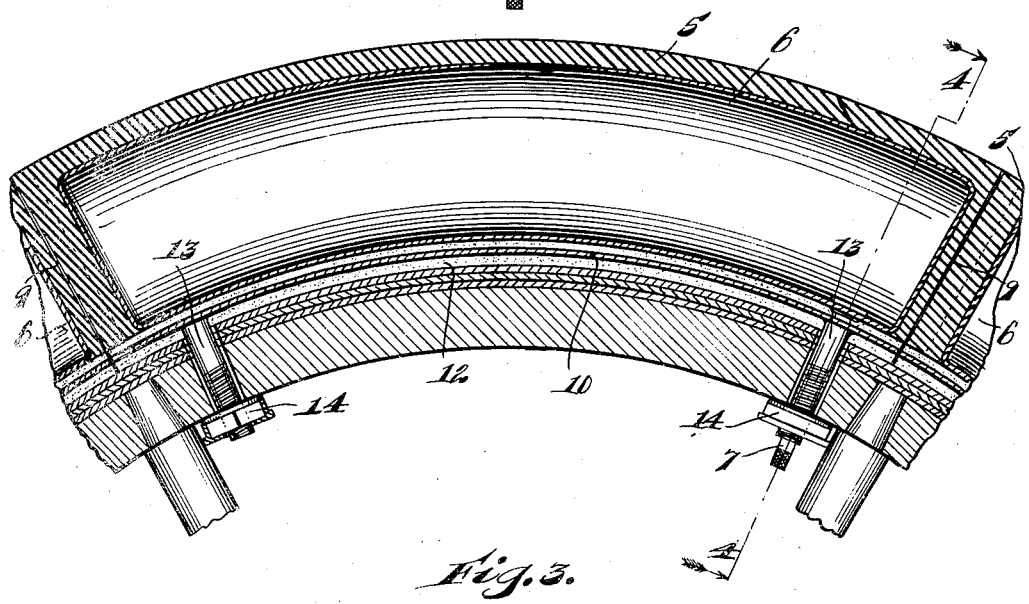
WITNESSES:
INVENTOR.
John K. Ross,
BY
his ATTORNEY

UNITED STATES PATENT OFFICE.

JOHN K. ROSS, OF CHICAGO, ILLINOIS.

PNEUMATIC TIRE.

1,321,556.  Specification of Letters Patent.  Patented Nov. 11, 1919.

Application filed October 8, 1917. Serial No. 195,329.

*To all whom it may concern:*

Be it known that I, JOHN K. ROSS, a citizen of the United States, and a resident of the city of Chicago, county of Cook, and State of Illinois, have invented certain new and useful Improvements in Pneumatic Tires, of which the following is a specification.

My invention relates to improvements in pneumatic tires, and has for its object the production of a tire of a sectional nature, whereby in case of puncture, only a small section of the tire or that punctured, need be replaced or repaired, the remaining sections or portions of the tire being unaffected by the punctured section or its removal or replacement.

A further object is the production of a tire as mentioned, which will be of durable and economical construction, and in which the tire sections will be so connected with the tire rim as to permit of ready and expeditious application or detachment.

Other objects will appear hereinafter.

The invention consists in the combinations and arrangements of parts hereinafter described and claimed.

The invention will be best understood by reference to the accompanying drawings forming a part of this specification, and in which, Figure 1 is a side elevation of a vehicle wheel equipped with a pneumatic tire embodying the invention, Fig. 2, a plan view of Fig. 1, Fig. 3, a central longitudinal section through one of the sections of the tire, and Fig. 4, a transverse section taken on line 4—4 of Fig. 3.

The preferred form of construction as illustrated in the drawings comprises a plurality of independent elongated arcuate sections, each of which comprises a casing 5 closed at its ends, said section being open only at the inner or base side thereof. Arranged in each casing member 5 is an air tube 6 provided with an inwardly extending air admission pipe 7 of conventional construction.

The independent sections which go to make up the tire are arranged end to end, the contiguous ends of adjacent sections being interlocked in order to maintain the sections in proper alinement. This interlocking of adjacent ends of said sections is effected by means of a tongue 8 provided upon one end of each section which is adapted to snugly engage with a groove or socket 9 provided in the adjacent end of the adjacent section. Said tongues and grooves are radially disposed with reference to the tire so as to permit of relative radial movement of the various sections as will probably result in the flexing or compression of the tire, when in use.

Each tire section is securely fastened to the rim in connection with which the same is employed, by means of a flexible elongated metallic plate 10 which is arranged at the base of each section casing 5, the longitudinal edges of each plate engaging with inwardly facing grooves 11 formed in the base edges of each section casing, as clearly seen in Fig. 5. With this arrangement the plate is adapted to clampingly engage with flanges 12 which will be constituted at the base of the section, so that when the plate is drawn toward the rim, through the medium of bolts 13 projecting from the plate and which pass through the rim, the plate will serve to securely clamp the flanges 12 and thus effectively lock the tire section to the rim. Nuts 14 threaded upon bolts or studs 13, coöperate therewith in securing the same to the tire rim, as will be readily understood. One of the bolts 13, coöperating with each tire section, is of tubular form, in order to permit of the passage of the air pipe 7 of the air tube therethrough.

With the construction set forth, it will be seen that in case of puncture or disabling of any one of the sections of the tire, the same may be readily and easily removed without disturbing any of the other sections, and repaired, or another section inserted in its place. Thus, it will be seen, that in case of a puncture or blow-out, but a very small portion of the tire will be affected. This will result in a material saving to an automobile owner, since, with tires of conventional construction, in case of a bad blow-out or puncture, the entire tire must be discarded. The construction is such that any one section may be readily and easily removed, making it possible to repair the punctured tire expeditiously.

While I have illustrated and described the preferred form of construction for carrying my invention into effect, this is capable of variations and modifications without departing from the spirit of the invention. I, therefore, do not wish to be limited to the precise details of construction set forth, but desire to avail myself of such variations and modifications as come within the scope of the appended claim.

Having described my invention what I claim as new and desire to secure by Letters Patent is:

A pneumatic tire comprising a plurality of independent contiguous sections arranged end to end, each of said sections comprising a casing having inwardly opening grooves at the inner edges thereof; an air tube arranged in each section casing; means for independently and detachably securing said sections to a tire rim, said means comprising an elongated plate arranged in the casing of each section and having the opposite edges engaging with the grooves provided in the inner edges thereof; studs projecting from the opposite ends of said plate, one of said studs being tubular to permit the passage of an air valve therethrough; and nuts co-acting with said studs to fasten said plates to a tire rim, substantially as described.

In testimony whereof I have signed my name to this specification in the presence of two subscribing witnesses.

JOHN K. ROSS.

Witnesses:
 JOSHUA R. H. POTTS,
 ARTHUR A. OLSON.